United States Patent
Blanchard et al.

(10) Patent No.: US 7,546,273 B2
(45) Date of Patent: *Jun. 9, 2009

(54) SYSTEM AND METHOD FOR EVALUATING RESIDUAL VALUES OF PRODUCTS

(75) Inventors: Jean Louis Blanchard, Quincy sous Senart (FR); Christelle Pavillon, Paris (FR); Stephane Lorin, Paris (FR); Hammou Messatfa, Levallois Perret (FR)

(73) Assignee: International Business Machines Corporation, Armonk, NY (US)

( * ) Notice: Subject to any disclaimer, the term of this patent is extended or adjusted under 35 U.S.C. 154(b) by 1013 days.

This patent is subject to a terminal disclaimer.

(21) Appl. No.: 10/229,540

(22) Filed: Aug. 28, 2002

(65) Prior Publication Data

US 2003/0074296 A1 Apr. 17, 2003

(30) Foreign Application Priority Data

Aug. 30, 2001 (EP) .................................. 01480080

(51) Int. Cl.
*G06Q 40/00* (2006.01)
(52) U.S. Cl. .......................................... 705/40; 705/35
(58) Field of Classification Search .............. 705/35–45
See application file for complete search history.

(56) References Cited

U.S. PATENT DOCUMENTS

| | | | | |
|---|---|---|---|---|
| 4,736,294 A * | 4/1988 | Gill et al. | ....................... | 705/38 |
| 6,192,325 B1 * | 2/2001 | Piety et al. | ................... | 702/184 |
| 6,385,594 B1 * | 5/2002 | Lebda et al. | .................. | 705/38 |
| 6,502,080 B1 * | 12/2002 | Eichorst et al. | ............. | 705/400 |
| 6,622,129 B1 * | 9/2003 | Whitworth | .................... | 705/37 |
| 2001/0032109 A1 * | 10/2001 | Gonyea et al. | ................. | 705/8 |
| 2002/0069216 A1 * | 6/2002 | Bates | ......................... | 707/500 |
| 2002/0072958 A1 * | 6/2002 | Yuyama et al. | ............... | 705/10 |
| 2003/0046199 A1 * | 3/2003 | Murase et al. | ................ | 705/35 |
| 2003/0105728 A1 * | 6/2003 | Yano et al. | ................... | 705/400 |
| 2006/0085325 A1 * | 4/2006 | Jammal et al. | ................ | 705/38 |

OTHER PUBLICATIONS

Extrapolation—Wikipedia, http://en.wikipedia.org/wiki/Extrapolation, p. 1-3.*
Blanchard, J. et al. "System and Method for Evaluating Maintenance Costs of Products", IBM Patent Application, File date to be assigned. Serial Number not available.

* cited by examiner

*Primary Examiner*—James Kramer
*Assistant Examiner*—Rajesh Khattar
(74) *Attorney, Agent, or Firm*—Fulbright & Jaworski LLP (57) ABSTRACT

A method and system to evaluate residual value of leased products, comprising a learning phase and an application phase. Each phase has two steps. The first consists in analyzing lease or product main parameter while the second uses other lease conditions or product characteristics. Analysis is based on a grid wherein several specific points are determined during the learning phase. An extrapolation of these points according to the parameters during the application phase gives a first approximation of residual value, which is adjusted using lease conditions or product characteristics. During the learning phase, the system determines the relevant lease conditions or product characteristics and the associated corrections used during the application phase.

14 Claims, 6 Drawing Sheets

FIG. 1

| Vehicle ID | Mileage (miles) | Duration (years) | Brand | Model | H.P. | ... | Cost ($) | Cost (cents/mile) |
|---|---|---|---|---|---|---|---|---|
| 85 203 | 20,428 | 3.21 | Citroën | Xantia | 110 | ... | 471.47 | 2.308 |
| 13 425 | 25,312 | 1.73 | BMW | 525i | 192 | ... | 828.46 | 3.273 |
| 37 263 | 35,379 | 2.14 | Audi | A4 | 125 | ... | 973.27 | 2.751 |
| 48 912 | 18,108 | 2.27 | Renault | Clio | 58 | ... | 348.76 | 1.926 |

| 110 | 115 | 130 | 135 | 140 | 500 | 700 | 705 | 710 |
|---|---|---|---|---|---|---|---|---|
| Mileage | Duration | H.P. | ... | Price ($) | $RV_o$(%) | | $RV_n$(%) | RP ($) |
| 22,526 | 2.42 | 125 | ... | 18,500 | 0.67 | | 0.62 | 11,470 |
| 31,803 | 2.81 | 75 | ... | 14,900 | 0.58 | | 0.59 | 8,791 |

FIG. 5B

SYSTEM AND METHOD FOR EVALUATING RESIDUAL VALUES OF PRODUCTS

FIELD OF THE INVENTION

The present invention relates to data processing systems and methods for managing product financing and more specifically to a data processing system and method for evaluating residual value of leased products.

BACKGROUND

Generally, products such as automobiles have been financed through a personal loan system, whereby the purchaser makes a down payment, takes title to the product and pays the loan balance in monthly payments which amortize the full amount of the loan. More recently, leasing arrangements have been introduced whereby the lessee makes monthly rental payments, returning the product to the lessor at the end of a predetermined term specified in the lease. Title to the product remains in the lessor. It is sometime specified in the lease that the lessee may at his option purchase the product for a stated value when the lease expire. The conditions of the lease may also include charges, e.g. a charge for abnormal mileage or wear and tear for lease of automobile.

U.S. Pat. No. 4,736,294 discloses data processing methods and apparatus for managing vehicle financing. The data processing system provides information to assist in granting a loan, and determining at the time of making the loan a residual value of the vehicle at a predetermine option date.

Considering vehicle leases, at the signing of a lease, lessee chooses a vehicle and states how many years he intends to keep it and the approximate mileage he intends to cover. Generally speaking, the lease duration is comprised between 1 to 4 years while the number of miles varies from 20,000 to 60,000. Depending upon the vehicle and lease duration and mileage, the lessor determines monthly rental payments at the time of making the lease by estimating the resale value factor at the end of the lease, also referred to as residual value factor, and costs due to the benefit margin, insurance and maintenance. Without taking into account the margin of the lessor, insurance, maintenance, and so forth, for sake of clarity, the sum of monthly rental payments corresponds to the difference between the sticker price, i.e. the purchasing price of the automobile as proposed by the manufacturer, and the resale price. If the resale price at the end of the lease is less than the estimation done at the time of making the lease, monthly rental payments have been underestimated and, as a consequence, the lessor loses money. Reciprocally, if the resale price at the end of the lease is more than the estimation done at the time of making the lease, monthly rental payments are overestimated and thus, the leases are not attractive. During the lease, lessee may modify it to adapt its duration or mileage if the lessor agrees. In such a case, the residual value has to be reevaluated to adjust monthly rental payment accordingly.

Residual price estimation is thus critical since it could lead to lessor financial losses or unattractive commercial offers. Generally, residual price (RP) is expressed as a function of the sticker price (SP) such as, $$RP = \alpha \times SP \quad (1)$$

where $\alpha$ is the residual value factor, referred to as RV in the following description, expressed as a percentage to be applied on the sticker price. Residual value factor depends mainly on the lease conditions, e.g. lease duration and mileage. However, the influence of unforeseeable external parameter such as vehicle popularity at the end of the lease, leads to the use of approximate residual value factor that are often determined experimentally by specialists.

SUMMARY OF THE INVENTION

Thus, it is a broad object of the invention to provide a method to remedy the shortcomings of the prior art as described here above.

It is another object of the invention to provide a method to learn the residual value factor behavior of leased products according to lease conditions or product characteristics.

It is still another object of the invention to provide a method to determine the residual value factor of leased products according to lease conditions or product characteristics.

It is yet another object of the invention to provide a method to determine relevant lease conditions or product characteristics to improve residual value factor accuracy of leased products and correct it accordingly.

It is a further object of the invention to provide a method to evaluate accurately the residual value of leased products.

The accomplishment of these and other related objects is achieved by a method to learn residual value factor behavior of leased products, using a learning database containing lease conditions and product characteristics and resale value factors associated therewith. Comprising the steps of:
  selecting at least one lease condition or product characteristic of said learning databas;
  specifying values of said at least one lease condition or product characteristic, determining residual value factors associated to said specified values of said at least one lease condition or product characteristic and building a first table storing said specified values of said at least one lease condition or product characteristic and said residual value factors associated therewith;
  estimating first residual value factors for records of said learning database from said first table; and,
  selecting at least one other lease condition or product characteristic of said learning database, determining residual value factor corrections associated with the modalities of said at least one other lease condition or product characteristic and said first residual value factors and building at least one other table storing the modalities of said at least one other lease condition or product characteristic and said residual value factor corrections associated therewith;
  wherein said first and at least one other table characterize the residual value factor behavior of the products contained in said learning database, The invention also includes a method to determine the residual value factor of a leased product wherein a learning phase has been performed according to the previous method, comprising the steps of:
  inputting the value of said leased product corresponding to said at least one lease condition or product characteristic;
  determining a first residual value factor estimation from said first table;
  inputting the value of said leased product corresponding to said at least one other lease condition or product characteristic;
  determining at least one residual value factor correction from said at least one other table; and,
  determining the residual value factor of said leased product by adding said first residual value factor evaluation with said at least one residual value factor correction.

Further advantages of the present invention will become apparent to the ones skilled in the art upon examination of the drawings and detailed description. It is intended that any additional advantages be incorporated herein. In particular, the method of the invention may be applied to long term rental that could be assimilate to lease in such case.

BRIEF DESCRIPTION OF THE DRAWINGS

FIG. 3 comprising FIGS. 3a, 3b and 3c, describes the algorithm used to determine residual value factors of significant lease duration/mileage pairs.

FIG. 4 comprising

FIG. 5 comprising FIGS. 5a and 5b describes the algorithm that is adapted to determine relevant lease conditions or vehicle characteristics to improve lease residual value factor accuracy and the associated corrections.

DETAILED DESCRIPTION

The method of the invention comprises a learning phase and an application phase. During the learning phase, the system analyses initial data to determine the behavior of the residual value factor regarding the lease conditions or product characteristics. This analysis performed on known data allows, during the application phase, evaluation of the residual value factor of leases that have not been used to train the system, e.g. leases for which the real resale value factor is unknown or leases which the real resale value factor is known that are used to test system accuracy.

For sake of illustration, the following description is based on leases of vehicles wherein main condition parameters are lease duration and mileage. However, the method of the invention may be used for any kind of product leases or for leases of vehicles wherein other main condition parameters are used.

Figure 1:
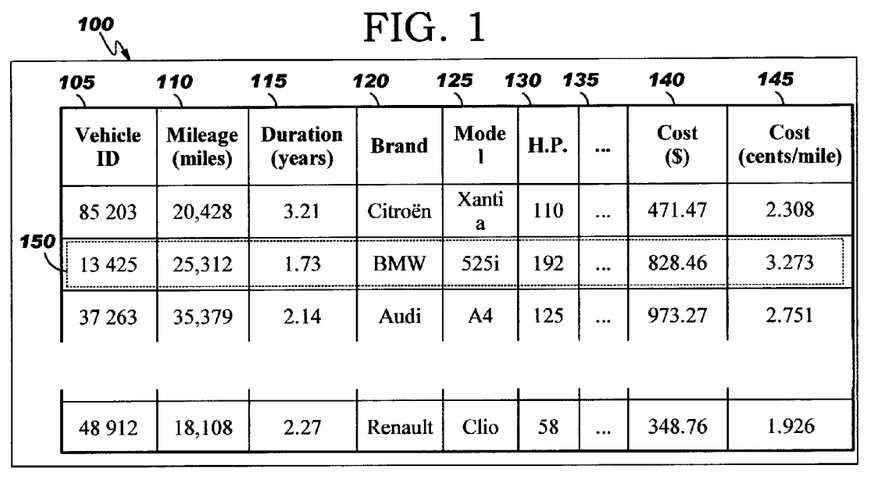
FIG. 1 shows the content of a typical table containing the data used to train the system.

FIG. 1 shows an example of table 100 containing initial values of lease characteristics, which is used as a database to train the system in the learning phase. Preferably, these initial values of lease characteristics are actual values gathered from past leases. Each row, e.g. 150, contains the information relative to a particular lease. Columns 105 to 140 of table 100 contain information representing lease conditions and vehicle characteristics. Column 105 contains the identification of the vehicles, columns 110 and 115 contain lease mileage and duration respectively, columns 120 to 130 contain vehicle characteristics. Column 135 contains other characteristics of the vehicle, not represented for sake of clarity, such as option, color, tank capacity and kind of gearbox. Column 140 contains vehicle sticker prices expressed in US dollars and column 145 contains the real resale value factors of the leased vehicles expressed in percentages. Real resale value factors are determined at the end of the lease by comparing sticker prices and resale prices and may be replaced by target factors, e.g. when resale prices are unknown. It is important to note that the values represented in table 100 are hypothetical values given for sake of illustration and do not represent real values. Row 150 represents the information relative to the lease of vehicle identified by reference 13 425 that is a BMW. In this example, the lessee has covered 25,312 miles during a period of 1.73 years. The model and horsepower are 525i and 192 respectively. The sticker price of this vehicle is US$ 37,350 while its resale value factor has been determined at the end of the lease, i.e. after 1.73 years and having covered 25,312 miles, by comparing sticker price and resale price, e.g. US$ 26,892, according to equation 1:

$$RV = 0.72 = \frac{US\ \$26,892}{US\ \$37,350}$$

Figure 2:
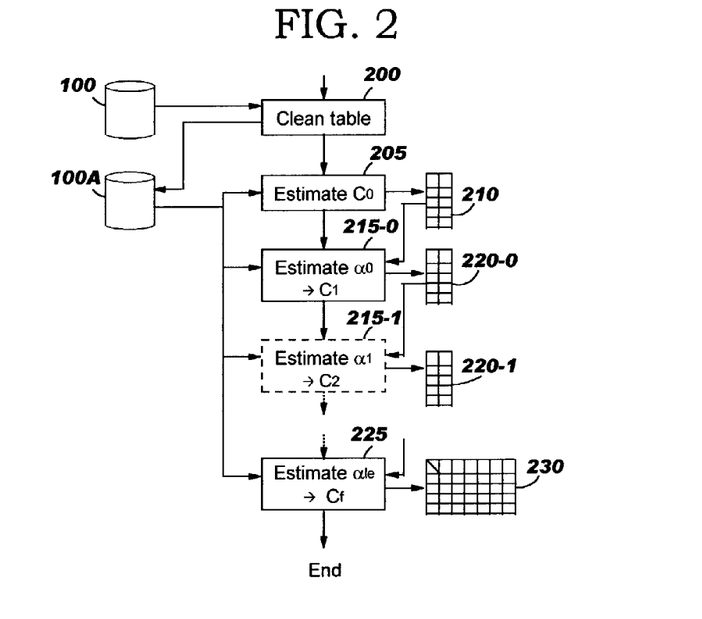
FIG. 2 depicts schematically the algorithm of the learning phase.

FIG. 2 illustrates schematically the learning phase algorithm. Table 100 may contain aberrant records or statistical outliers that are preferably removed to improve system accuracy. To that end, a first optional step (step 200) consists in analyzing the data contained in learning table 100 to detect aberrant records using standard statistical techniques such as looking distribution of columns. Aberrant records are isolated so as to create table 100A that contains only relevant data.

Then, a first training step consists in using table 100A records to create table 210 so as to associate first residual value factor estimations to significant lease duration/mileage pairs (step 205). Table 210 column labels represent lease duration and row labels represent lease mileage. Extrapolations of table 210 values according to the vehicle lease duration and mileage stored in table 100A are performed to determine a first residual value estimation $RV_0$ for each vehicle lease (step 215).

Then, a second training step includes analyzing lease conditions or vehicle characteristics that modify accurately first residual value factor estimations. A first correction includes determining the most relevant combination of such characteristics and memorizing them with the corresponding residual value factor corrections according to the difference between the residual value factor estimation $RV_0$ and the real resale value factor RV in table 225-1. Depending upon the required accuracy of the system a second correction, based on the same principle, may be performed (step 220-2). In such case, a second correction table 220-2 is created with the selected characteristic combination and the associated residual value factor corrections according to the difference between the residual value estimation after first correction ($RV_1$) and the residual value estimation $RV_0$. Other corrections can be done so as to reach required system accuracy. Step 205, 215 and 220-i are detailed in the following description by reference to FIGS. 3, 4 and 5 respectively.

Figure 3A:
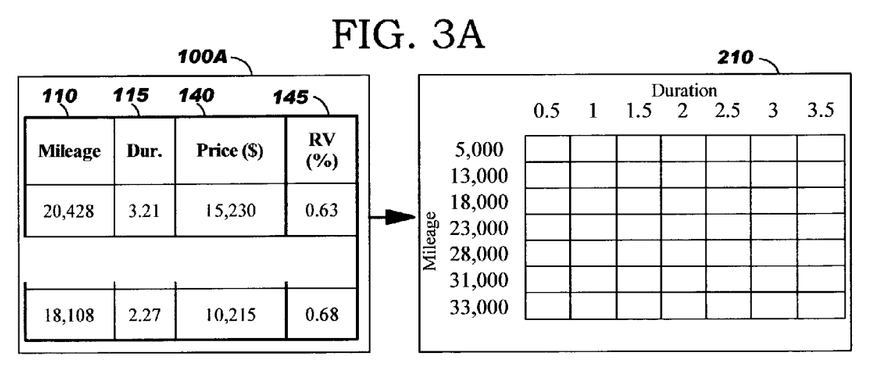

FIG. 3 illustrates the way of evaluating the content of table 210 as illustrated in box 205 of FIG. 2. FIG. 3a comprises columns 110, 115, 140 and 145 of table 100A, containing the lease mileage, lease duration, sticker prices and resale value factors respectively, that are necessary for such evaluation. As mentioned above and depicted on FIG. 3a, table 210 abscissas and ordinates represent the lease duration and mileage respectively. Each cell of table 210 corresponds to the residual value factor, expressed in percentage, of a significant lease duration/mileage pair. Table 210 row and column numbers, which may be different, depend upon the number of records contained in learning table 100A. These numbers are determined in such a way that the number of table cells is sufficient to reach required system accuracy and small enough so that a residual value factor may be estimated for all the cells using learning table 100A records. In practice, a number of 7 rows and columns gives good results.

In this example, the lease duration and mileage values of table 210 columns and rows respectively are determinate in such a way that the distribution of learning table 10A records is uniform regarding rows and columns, i.e. the number of records included between the values of two adjacent columns is constant and the number of records included between the values of two adjacent rows is also constant. As an illustration, let us consider the following example: learning table 100A contains 100 records and table 210 comprises 3 columns and 3 rows that represents values $D_1$, $D_2$, $D_3$ and $M_1$, $M_2$, $M_3$ respectively. Thus, the values of $D_1$, $D_2$ and $D_3$ must be chosen so that the lease duration of 25 vehicles falls between $D_1$ and $D_2$ and 25 between $D_2$ and $D_3$. Likewise, the values of $M_1$, $M_2$ and $M_3$ are chosen so that the lease mileage of 25 vehicles is comprised between $M_1$ and $M_2$ and 25 between $M_2$ and $M_3$.

Figure 3B:
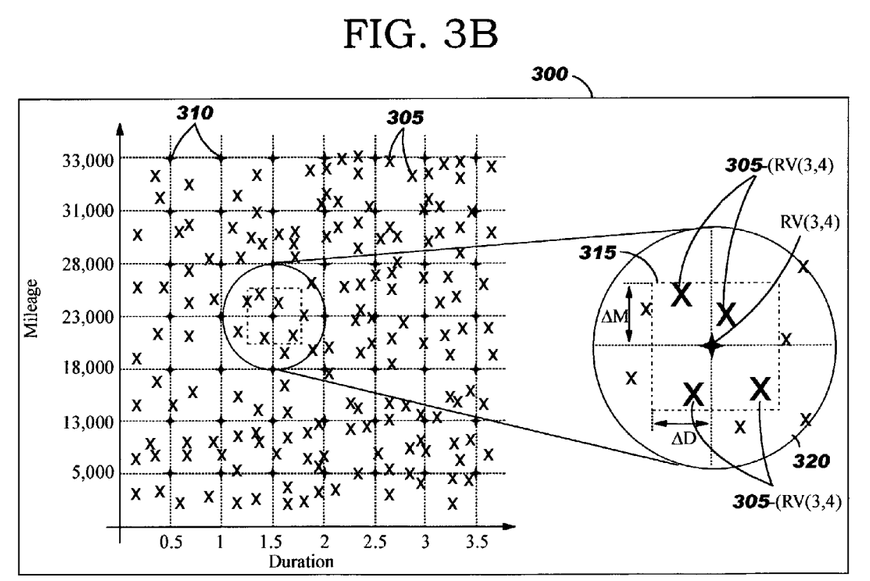

The residual value factor of each table 210 cell is evaluated as illustrated on FIG. 3b that represents a 2-dimensional space referred to as 300 where abscissas and ordinates represent lease duration and mileage respectively. FIG. 3b has to be analyzed in conjunction with FIG. 3c that represents the used algorithm. Learning table 100A records are represented by marks referred to as 305 while the significant points to which the residual value factors have to be evaluated, i.e. the points corresponding to table 210 cells, are referred to as 310. Residual value factor of each point is extrapolate from the residual value factors of its surrounding points that are included in a window 315 as illustrated in zoom 320. In this example, the residual value factor to be evaluated, referred to as RV(3,4), corresponds to a lease duration and mileage of 1.5 years and 23,000 miles respectively. Its coordinates on the represented grid are (3,4) that correspond to the third column and fourth row of table 210. The residual value factors used for this evaluation are those associated with points referred to as 305-RV(3,4), localized in window 315. Size of window 315 is defined by ΔD and ΔM that are parameters set by the user.

Figure 3C:
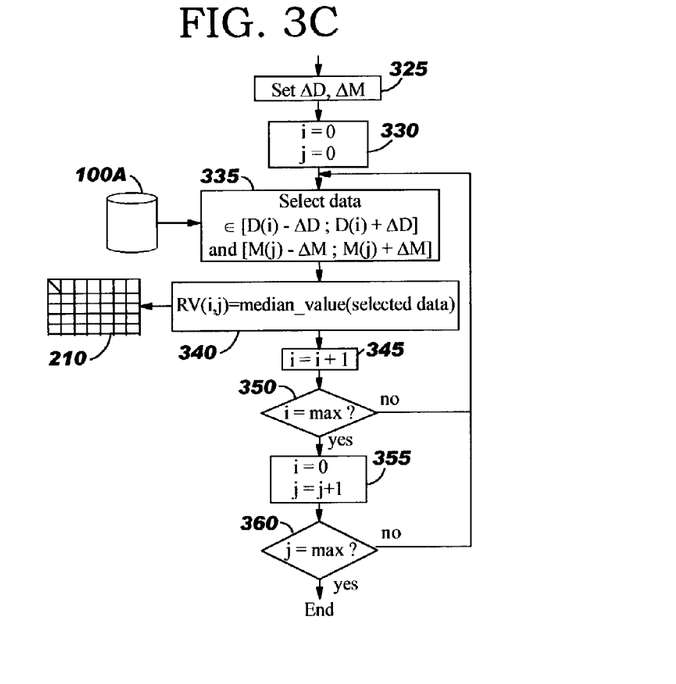

FIG. 3c illustrates the main steps of the algorithm used to evaluate table 210 cells. After having set ΔD and ΔM parameters to define the size of window 315 (step 325), i and j indexes representing both the indices of table 210 cells and points 310 are set to zero (step 330). Points 305 surrounding the one defined with indexes i and j that are included in window 315 are selected, e.g. points 305-RV(3,4), (step 335) and the median value of the residual value factors associated to these selected points is evaluated and memorized in table 210 cell defined with indexes i and j (step 340). D(i) and M(j) represent the lease duration and mileage, respectively, of the table 210 cell defined by indexes i and j. Index i is incremented (step 345) and a test is performed to detect whether or not index i has reached its maximum value, i.e. the number of table 210 columns (step 350). If index i has not reached its maximum value, the last 3 steps are repeated. If index i has reached its maximum value, it is set to zero, index j is incremented (step 355) and a test is performed to detect whether or not index j has reached its maximum value, i.e. the number of table 210 rows (step 360). If index j has not reached its maximum value, the last 5 steps are repeated. If index j has reached its maximum value, the process is stopped, i.e. the residual value factors of all table 210 cells have been evaluated.

Figure 4A:
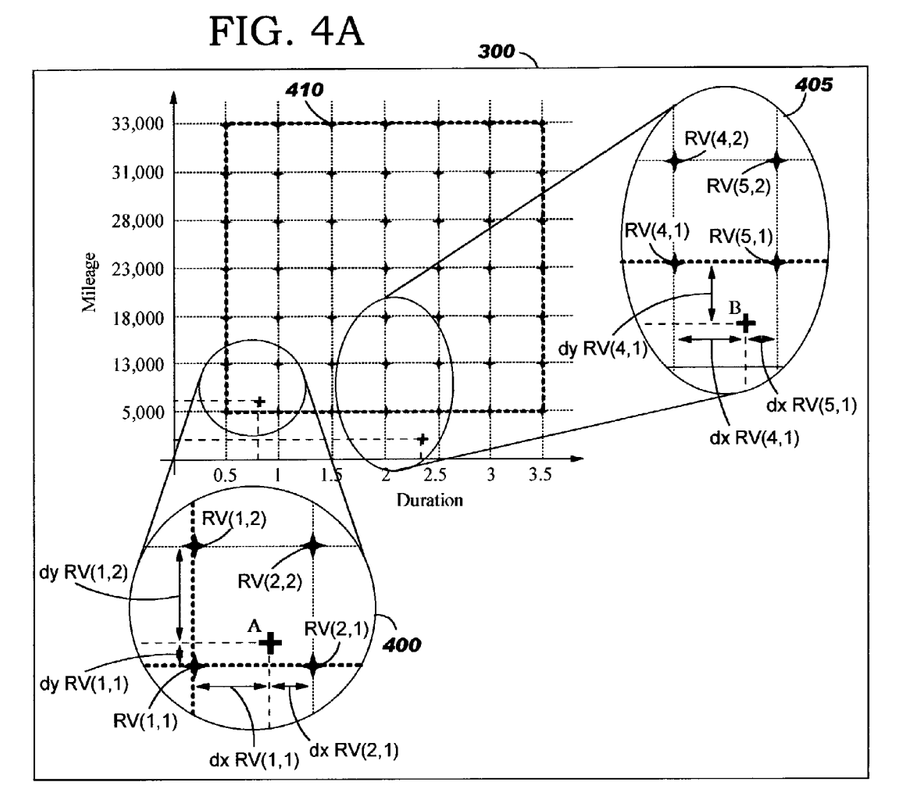
FIGS. 4a and 4b, illustrates the algorithm used to evaluate a first residual value factor evaluation according to lease duration and mileage.
Figure 4B:
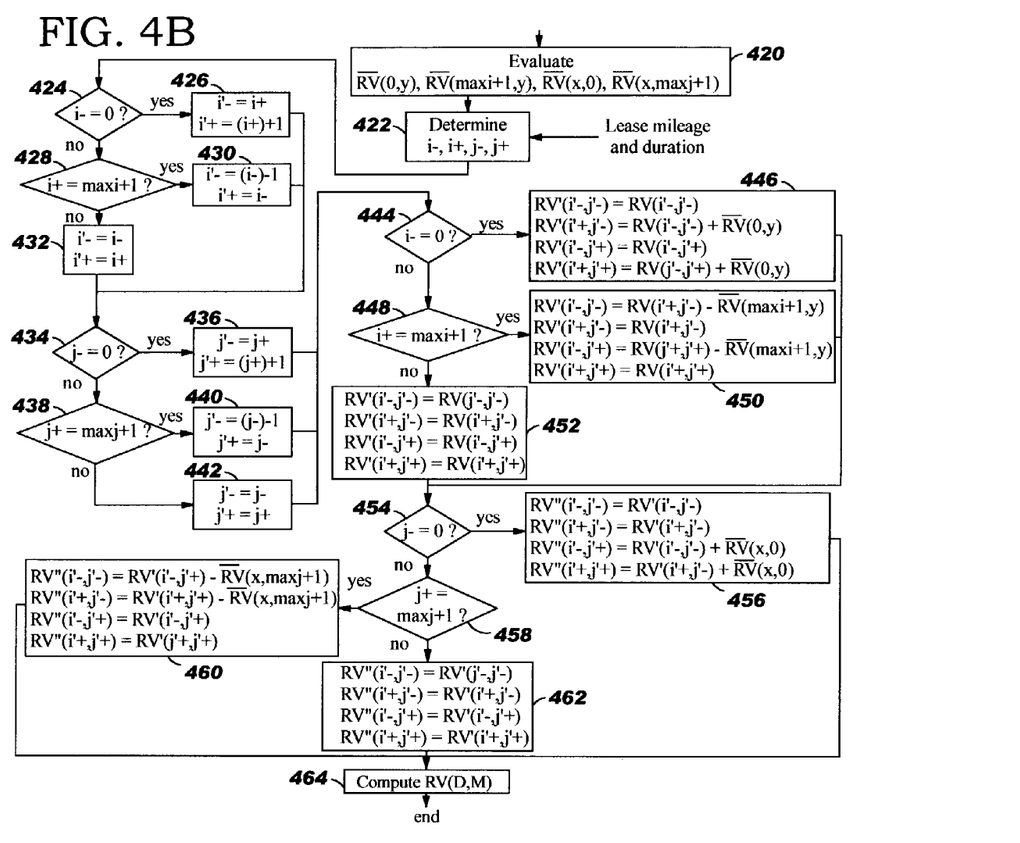

FIG. 4 illustrates the use of table 210 represented by box 215 on FIG. 2 to extrapolate a residual value factor for a particular lease duration and mileage pair. FIG. 4a, representing 2-D space 300 in which table 100A records have been suppressed for sake of clarity, shows two examples of residual value factor evaluations in zooms 400 and 405. FIG. 4b describes the algorithm used for residual value factor extrapolation. Step 420 consists in computing constant values $\overline{RV}(0,y)$, $\overline{RV}(\max i+1,y)$, $\overline{RV}(x,O)$ and $\overline{RV}(x,\max j+1)$ according to the following equations:

$$\overline{RV}(0, y) = \frac{\sum_{k=1}^{\max j} (RV(2, k) - RV(1, k))}{\max j} \quad (2)$$

$$\overline{RV}(\max i+1, y) = \frac{\sum_{k=1}^{\max j} (RV(\max i, k) - RV(\max i - 1, k))}{\max j} \quad (3)$$

$$\overline{RV}(x, O) = \frac{\sum_{k=1}^{\max i} (RV(k, 2) - RV(k, 1))}{\max i} \quad (4)$$

$$\overline{RV}(x, \max j+1) = \frac{\sum_{k=1}^{\max i} (RV(k, \max j) - RV(k, \max j - 1))}{\max i} \quad (5)$$

where maxi and maxj are the number of table 210 columns and rows respectively. It is to be noticed that step 420 needs to be executed only once. After lease duration (D) and mileage (M) have been inputted, variables i−, i+, j− and j+ are evaluated (step 422). Variable i− corresponds to the maximum table 210 abscissa that corresponds to the greatest table 210 lease duration that is less than the inputted lease duration, i+ corresponds to the minimum table 210 abscissa that corresponds to the least table 210 lease duration that is greater than inputted lease duration, j− corresponds to the maximum table 210 ordinate that corresponds to the greatest table 210 lease mileage that is less than the inputted lease mileage and j+ corresponds to the minimum table 210 ordinate that corresponds to the least table 210 lease mileage that is greater than the inputted lease mileage.

For example, considering point β on FIG. 4a, (i−)=4, (i+)=5, (j−)=0 and (j+)=1. A first test is performed to detect whether or not i− is equal to zero (step 424). If i− is equal to zero, i'− and i'+ indexes are set to i+ and (i+)+1 respectively (step 426). If i− is not equal to zero, a second test is performed to detect whether or not i+ is equal to maxi+1 (step 428). If i+ is equal to maxi+1, i'− and i'+ indexes are set to (i−)−1 and i− respectively (step 430), else if i− is not equal to zero and i+ is not equal to maxi+1, i'− and i'+ indexes are set to i− and i+ respectively (step 432) Then, a test is performed to detect if j− is equal to zero or not (step 434). If j− is equal to zero, j'− and j'+ indexes are set to j+ and (j+)+1 respectively (step 436). If j− is not equal to zero another test is performed to detect whether or not j+ is equal to maxj+1 (step 438). If j+ is equal to maxj+1, j'− and j'+ indexes are set to (j−)−1 and j− respectively (step 440). If j− is not equal to zero and j+ is not equal to maxj+1, j'− and j'+ indexes are set to j− and j+ respectively (step 442). At the end of steps 424 to 442, a value has been assigned to i'−, i'+, j'− and j'+ indexes whatever the value of i−, i+, j− and j+ is. For example considering points α and β as shown on FIG. 4a, α: i−=1, i+=2, j−=1, j+=2 ➔ i'−=1, i'+=2, j'−=1, j'+=2

β: i−=4, i+=5, j−=0, j+=1 ➔ i'−=4, i'+=5, j'−=1, j'+=2

Then, tests corresponding to steps 424, 428, 434 and 438 are performed again and provisional residual value factors are estimated.

If i− is equal to zero (step 444), provisional residual value factors RV'(i'−,j'−), RV'(i'+,j'−), RV'(i'−,j'+) and RV'(i'+,j'+) are estimated according to the following equations (step 446):

$$RV'(i'-,j'-)=RV(i'-,j'-) \quad (6\text{-}1)$$

$$RV'(i'+,j'-)=RV(i'-,j'-)+\overline{RV}(0,y) \quad (7\text{-}1)$$

$$RV'(i'-,j'+)=RV(i'-,j'+) \quad (8\text{-}1)$$

$$RV'(i'+,j'+)=RV(i'-,j'+)+\overline{RV}(0,y) \quad (9\text{-}1)$$

where RV(D,M) is the residual value factor of the lease duration D and mileage M.

If i+ is equal to maxi+1 (step 448), provisional residual value factors RV'(i'−,j'−), RV'(i'+,j'−), RV'(i'−,j'+) and RV'(i'+,j'+) are estimated according to the following equations (step 450):

$$RV'(i'-,j'-)=RV(i'+,j'-)-\overline{RV}(\max i+1,y) \quad (6\text{-}1)$$

$$RV'(i'+,j'-)=RV(i'+,j'-) \quad (7\text{-}2)$$

$$RV'(i'-,j'-)=RV(i'+,j'+)-\overline{RV}(\max i+1,y) \quad (8\text{-}2)$$

$$RV'(i'+,j'+)=RV(i'+,j'+) \quad (9\text{-}2)$$

If i− is not equal to zero and i+ is not equal to maxi+1, provisional residual value factors RV'(i'−,j'−), RV'(i'+,j'−), RV'(i'−,j'+) and RV'(i'+,j'+) are estimated according to the following equations (step 452):

$$RV'(i'-,j'-)=RV(i'-,j'-) \quad (6\text{-}3)$$

$$RV'(i'+,j'-)=RV(i'+,j'-) \quad (7\text{-}3)$$

$$RV'(i'-,j'+)=RV(i'-,j'+) \quad (8\text{-}3)$$

$$RV'(i'+,j'+)=RV(i'+,j'+) \quad (9\text{-}3)$$

If j− is equal to zero (step 454), provisional residual value factors RV"(i'−,j'−), RV"(i'+,j'−), RV"(i'−,j'+) and RV"(i+,j+) are estimated according to the following equations (step 456):

$$RV''(i'-,j'-)=RV'(i'-,j'-) \quad (10\text{-}1)$$

$$RV''(i'+,j'-)=RV'(i'+,j'-) \quad (11\text{-}1)$$

$$RV''(i'-,j'+)=RV'(i'-,j'-)+\overline{RV}(x,0) \quad (12\text{-}1)$$

$$RV''(i'+,j'+)=RV'(i'+,j'-)+\overline{RV}(x,0) \quad (13\text{-}1)$$

If j+ is equal to maxj+1 (step 458), provisional residual value factors RV"(i'−,j'−), RV"(i'+,j'−), RV"(i'−,j'+) and RV"(i',j'+) are estimated according to the following equations (step 460):

$$RV'''(i'-,j'-)=RV'(i'-,j'+)-\overline{RV}(x,\max j+1) \quad (10\text{-}2)$$

$$RV'''(i'+,j'-)RV'(i'+,j'+)-\overline{RV}(x,\max j+1) \quad (11\text{-}2)$$

$$RV''(i'-,j'+)=RV'(i'-,j'+) \quad (12\text{-}2)$$

$$RV''(i'+,j'+)=RV'(i'+,j'+) \quad (13\text{-}2)$$

If j− is not equal to zero and j+ is not equal to maxj+ 1, provisional residual value factors RV"(i'−,j '−), RV"(i'+,j'−), RV"(i'−,j'+) and RV"(i'+,j'+) are estimated according to the following equations (step 462)

$$RV'''(i'-,j'-)=RV'(i'-,j'-) \quad (10\text{-}3)$$

$$RV''(i'+,j'-)=RV'(i'+,j'-) \quad (11\text{-}3)$$

$$RV''(i'-,j'+)=RV'(i'-,j'+) \quad (12\text{-}3)$$

$$RV'''(i'+,j'+)=RV'(i'+,j'+) \quad (13\text{-}3)$$

Then, residual value factor is computed according to the following equation (step 464)

$$RV(D,M) = RV''(i'-,j'-) \cdot \frac{dxRV(i'+,j'-)}{d(RV(i'-,j'-),RV(i'+,j'-))} \cdot \frac{dyRV(i'-,j'+)}{d(RV(i'-,j'-),RV(i'-,j'+))} + \\ RV''(i'+,j'-) \cdot \frac{dxRV(i'-,j'-)}{d(RV(i'-,j'-),RV(i'+,j'-))} \cdot \frac{dyRV(i'-,j'+)}{d(RV(i'-,j'-),RV(i'-,j'+))} + \\ RV''(i'-,j'+) \cdot \frac{dxRV(i'+,j'-)}{d(RV(i'-,j'-),RV(i'+,j'-))} \cdot \frac{dyRV(i'-,j'-)}{d(RV(i'-,j'-),RV(i'-,j'+))} + \\ RV''(i'+,j'+) \cdot \frac{dxRV(i'-,j'-)}{d(RV(i'-,j'-),RV(i'+,j'-))} \cdot \frac{dyRV(i'-,j'-)}{d(RV(i'-,j'-),RV(i'-,j'+))} \quad (14)$$

where, dxRV(i,j) is the signed distance along the x axis between the point that residual value factor is being evaluated and point (i,j), expressed in years;

dyRV(i,j) is the signed distance along the y axis between the point that residual value factor is being evaluated and point (i,j), expressed in miles;

d(RV(i,j),RV(k,l)) is the distance between points (i,j) and (k,l), expressed in (years$^2$+miles$^2$)$^{1/2}$.

For example, considering point α and β as shown on FIG. 4a, the residual value factor is:

$$RV(\alpha) = RV''(1,1) \cdot \frac{dxRV(2,1)}{d(RV(1,1),RV(2,1))} \cdot \frac{dyRV(1,2)}{d(RV(1,1),RV(1,2))} + \\ RV''(2,1) \cdot \frac{dxRV(1,1)}{d(RV(1,1),RV(2,1))} \cdot \frac{dyRV(1,2)}{d(RV(1,1),RV(1,2))} + \\ RV''(1,2) \cdot \frac{dxRV(2,1)}{d(RV(1,1),RV(2,1))} \cdot \frac{dyRV(1,1)}{d(RV(1,1),RV(1,2))} + \\ RV''(2,2) \cdot \frac{dxRV(1,1)}{d(RV(1,1),RV(2,1))} \cdot \frac{dyRV(1,1)}{d(RV(1,1),RV(1,2))}$$

with,

RV"(1,1)=RV(1,1)
RV"(2,1)=RV(2,1)
RV"(1,2)=RV(1,2)
RV"(2,2)=RV(2,2)

$$RV(\beta) = RV'''(4,1) \cdot \frac{dxRV(5,1)}{d(RV(4,1),RV(5,1))} \cdot \frac{dyRV(4,2)}{d(RV(4,1),RV(4,2))} + \\ RV''(5,1) \cdot \frac{dxRV(4,1)}{d(RV(4,1),RV(5,1))} \cdot \frac{dyRV(4,2)}{d(RV(4,1),RV(4,2))} + \\ RV''(4,2) \cdot \frac{dxRV(5,1)}{d(RV(4,1),RV(5,1))} \cdot \frac{dyRV(4,1)}{d(RV(4,1),RV(4,2))} +$$

-continued $$RV''(5,2) \cdot \frac{dxRV(4,1)}{d(RV(4,1), RV(5,1))} \cdot \frac{dyRV(4,1)}{d(RV(4,1), RV(4,2))}$$

with,

RV"(4,1)=RV(4,1)
RV"(5,1)=RV(5,1)
RV'(4,2)=RV(4,1)+$\overline{R}$(x,0)
RV"(5,2)=RV(5,1)+$\overline{RV}$(x,0)

Using the method presented by reference to FIG. 4 to evaluate the residual value factor of an input lease duration and mileage, the residual value factor may be estimated for all table 100A records. The results may be memorized in table 100B so as to determine other lease conditions or vehicle characteristics that may improve residual value factor estimation accuracy as illustrated in boxes 220-1 and 220-2 of FIG. 2.

Figure 5A:
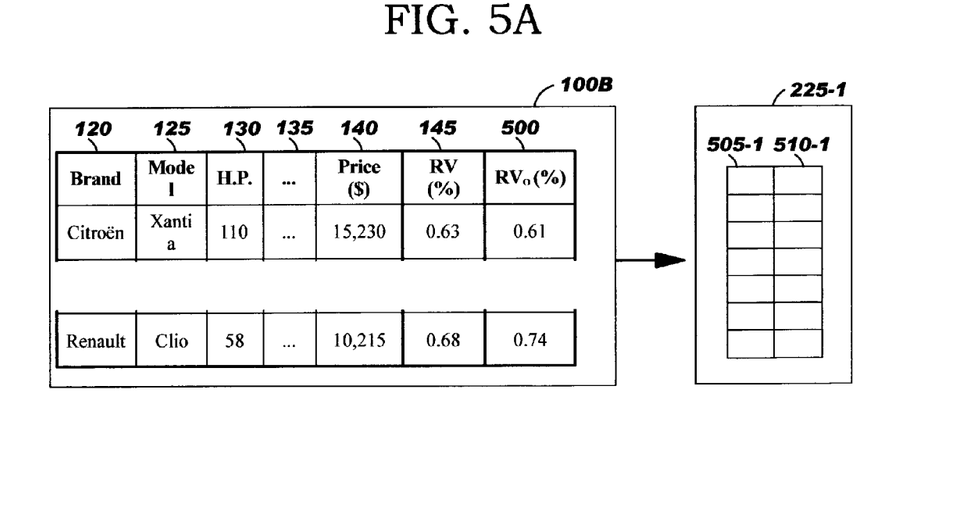

FIG. 5 illustrates the method used to determinate the relevant variables that improve residual value factor accuracy. FIG. 5a shows table 100B that corresponds to table 100A in which residual value factors $RV_0$, estimated according to the method presented by reference to FIG. 4, have been added and table 225-1 that comprises two columns 505-1 and 510-1. Table 225-2 uses for a second correction looks like table 225-1 and comprises columns 505-2 and 510-2. As many tables 225-i as required may be used. Column 505-i contains all the values that can be reached by selected variable, i.e. the modalities of this selected variable, and column 510-i contains residual value factor corrections associated therewith. It is to be noted that a variable may be a single lease condition or vehicle characteristic such as vehicle "color" or "gearbox type" or a combination of lease condition or vehicle characteristics such as "color and gearbox type". Considering the "color" variable, its modalities are "green", "red", and so forth. When a variable comprises a continuous value, its modalities could be represented by discrete values, i.e. ranges of values. The residual value factor correction is a value that is added to the estimated residual value factor according to the following equation:

$$RV_i = RV_{i-1} + RVC_i(j,k) \quad (15)$$

where $RVC_i(j,k)$ is the $i^{th}$ residual value factor correction according to variable j and modality k.

Figure 5B:
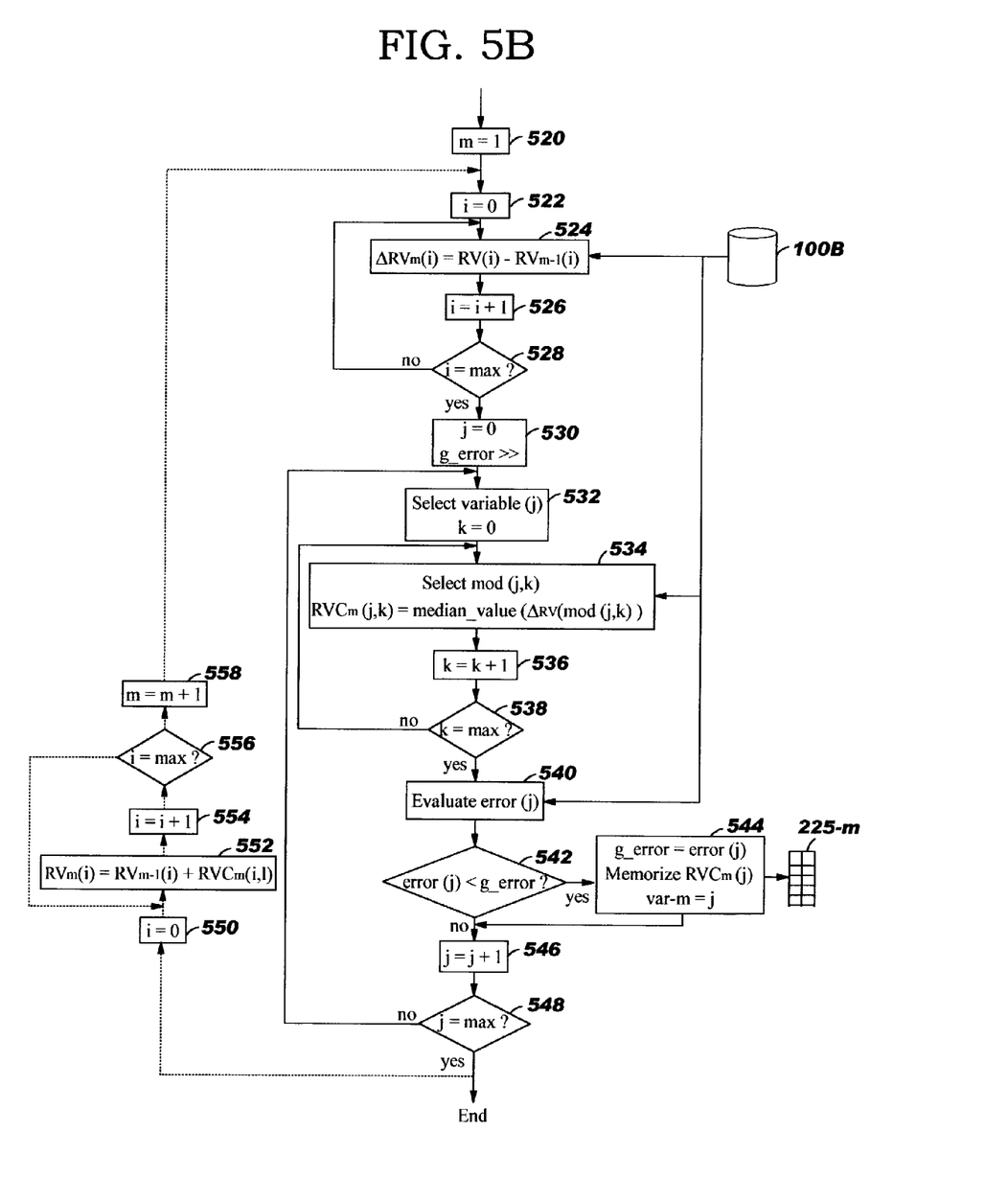

FIG. 5b represents the algorithm used to determine the content table 225-i. After having initialized indexes m to one and i to zero (steps 520 and 522 respectively), the residual value factor error, i.e. the difference between resale and estimated residual value factors, is computed for record i, memorized in table 100B, (step 524) and index i is incremented by one (step 526). A test is performed to detect whether or not index i has reached its maximum value, i.e. the number of table 100A records, (step 528). If index i has not reached its maximum value, the last two steps are repeated. If index i has reached its maximum value, index j is set to zero and g_error to a great value, e.g. the greater possible error value, (step 530). Then, the variable associated to index j is selected from a table or file containing all the variables to be tested and index k is set to zero (step 532). Modality corresponding to index k of variable corresponding to index j is selected and the median value of the difference between resale and estimated residual value factors of table 100B records corresponding to this selected modality is evaluated and set as residual value correction for modality corresponding to index k (step 534). Index k is incremented by one and a test is performed to detect whether or not index k has reached its maximum value, i.e. all the modalities of variable corresponding to index j have been selected, (steps 536 and 538 respectively). If index k has not reached its maximum value, last two steps are repeated. If index k has reached its maximum value, the global error of residual value factor estimated using the computed residual value corrections is determined (step 540). For example, this global error could be the number of table 100B records for which the difference between the estimated residual value factor, taking into account residual value corrections, and the resale value factor is greater than a predefined threshold. A test is performed to determine whether or not this error is less than g_error (step 542). If this error is less than g_error, g_error is set to this error, modalities of variable corresponding to index j are memorized in table 225-m with their associated residual value corrections in columns 505-m and 510-m respectively (step 544) and var-m is set to j. Then, index j is incremented by one (step 546) and compared to its maximum possible value (step 548). If index j has not reached its maximum value, i.e. all the variable to be tested have not been tested, steps 532 to 548 are repeated. If index j has reached its maximum value the process is stopped or repeated to improve system response accuracy as as shown in FIG. 5b. In this latter case, index i is set to zero (step 550) and the residual value factor of table 100B record i, corrected with corresponding residual value correction, is computed according to equation 15, 1 represents the modality of record i relative to selected variable var-m (step 552). Index i is incremented by one and a test is performed to determine whether or not index i has reached its maximum value, i.e. the residual value factor taking into account residual value correction has been evaluated for all table 100B records (steps 554 and 556 respectively). If index i has not reached its maximum value, the last two steps are repeated and if index i has reached it, index m is incremented by one (step 558) and steps 522 to 548 are repeated. At the end of the process described by reference to FIG. 5b, the best variables that improve residual value factors have been selected and memorized and tables 225-i have been completed so as to improve residual value factors obtained according to the method described by reference to FIG. 4 using equation 15.

For example, the variables determined with the above mentioned algorithm may be a combination of vehicle brand and model as first variable and vehicle horsepower as second variable.

Figure 6:
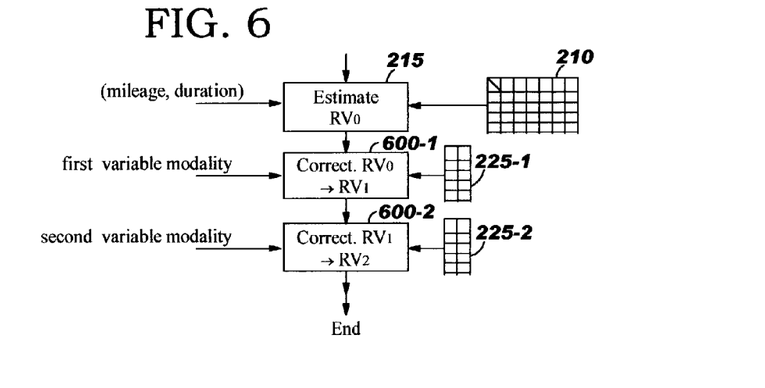
FIG. 6 illustrates the algorithm adapted to evaluate the residual value of a particular lease.

FIG. 6 illustrates the algorithm of the application phase, used to evaluate the residual value at the time of making the lease, when the lease conditions and vehicle characteristics are known but the resale value factor is unknown. After having inputted lease duration and mileage, a first residual value factor estimation is performed using table 210 and the method as described by reference to FIG. 4 (step 215). Then a first correction is done by selecting residual value correction corresponding to the first variable modality of the analyzed lease in table 225-1. The first residual value factor is updated according to equation 15 (step 600-1). Depending upon the learning phase and the required accuracy, steps 600-2, and so forth, may be performed as needed.

Figure 7:
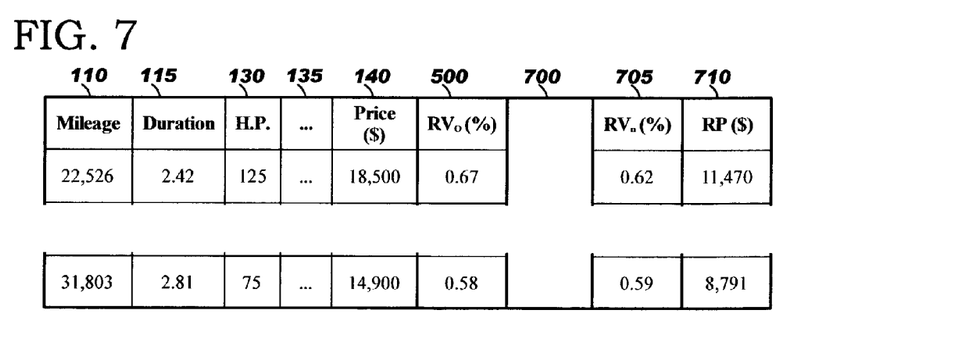
FIG. 7 shows an example of results obtained with the method of the invention.

FIG. 7 shows an example of the results that may be obtained using the method of the invention to determine residual value factors, after the system has been trained. In this example the lease conditions and vehicle characteristics are stored in a table 100C looking like table 100 in which the resale value factor is missing. Column 500 represents the residual value factor evaluated according to the method described by reference to FIG. 4, table 210 and equation 14. Column 700 contains the residual value factors corrected using table 225-i at several steps and column 705 contains the residual value factors corrected at last step n. The content of columns 700 and 705 is evaluated according to equation 15. Column 710 represents the estimated resale price computed according to equation 1 where $\alpha = RV_n$, i.e. the sticker price contained in column 140 multiplied by the final residual value factor contained in column 705.

While the invention has been described in term of preferred embodiments, those skilled in the art will recognize that the invention can be practiced differently without departing from the spirit and scope of the invention as defined by the appended claims. In particular, vehicles may be classified according to criteria such as their category or utilization type, e.g. Touring/LCVs/gasoline/diesel, in order to create as many tables 210 and 225-i as vehicle classes to improve system accuracy. In such cases, one learning phase is performed per class. Likewise, 2-dimensional table 210 may be replaced by an n-dimensional (n being an integer) and the learning database 100 may be replaced by several learning databases, e.g. the first one being used to create table 210, i.e. first learning step, and the second one being used to determine relevant lease conditions or product characteristics and their associated corrections, i.e. second learning step. The method and system of the invention could also be applied for long term rental.

We claim:

1. A method for use in a data processing system to learn residual value factors of leased products, using a learning database containing lease durations and lease mileage and resale value factors associated therewith, comprising the steps of:

selecting by the data processing system at least one lease duration and lease mileage of said learning database;

specifying by the data processing system values of said at least one lease duration and lease mileage, determining residual value factors associated with said specified values of said at least one lease duration and lease mileage from said learning database and building a first table storing said specified values of said at least one lease duration and lease mileage and said residual value factors associated therewith;

estimating by the data processing system first residual value factors for records of said learning database from said first table;

selecting by the data processing system at least one modality comprising a lease condition or product characteristic of said learning database, determining residual value factor corrections associated with the selected modality of the lease condition or product characteristic and said first residual value factors, and building at least one other table storing the selected modality and said residual value factor corrections associated therewith; and determining by the data processing system a residual value factor of a leased product by adding a first residual value factor estimation from the first table with at least one residual value factor correction from the at least one other table, the at least one residual value factor correction being based upon a modality of the leased product, wherein said first and at least one other table characterize residual value factor behavior of the products contained in said learning database, and wherein said steps of determining residual value factors and building said first table comprise the steps of:

setting a window value for each of said at least one lease duration and lease mileage;

for each of said specified values of said at least one lease duration and lease mileage:

storing said specified value in said first table;

selecting records of a learning database whose values according to said at least one lease duration and lease mileage belong to a range defined by said specified value and said window values;

extrapolating a residual value factor RV(D,M) from the residual value factors associated with said selected records according to the equation $$RV(D, M) = RV''(i'-, j'-) \cdot \frac{dxRV(i'+, j'-)}{d(RV(i'-, j'-), RV(i'+, j'-))} \cdot \frac{dyRV(i'-, j'+)}{d(RV(i'-, j'-), RV(i'-, j'+))} + \\ RV''(i'+, j'-) \cdot \frac{dxRV(i'-, j'-)}{d(RV(i'-, j'-), RV(i'+, j'-))} \cdot \frac{dyRV(i'-, j'+)}{d(RV(i'-, j'-), RV(i'-, j'+))} + \\ RV''(i'-, j'+) \cdot \frac{dxRV(i'+, j'-)}{d(RV(i'-, j'-), RV(i'+, j'-))} \cdot \frac{dyRV(i'-, j'-)}{d(RV(i'-, j'-), RV(i'-, j'+))} + \\ RV''(i'+, j'+) \cdot \frac{dxRV(i'-, j'-)}{d(RV(i'-, j'-), RV(i'+, j'-))} \cdot \frac{dyRV(i'-, j'-)}{d(RV(i'-, j'-), RV(i'-, j'+))}$$ (14)

wherein

RV''' (D,M) is a provisional residual value factor corresponding to a lease duration D and a lease mileage M, i and j are index value integers defining a cell of lease duration value and a lease mileage value having a specified range defined by said window values, respectively, i− corresponds to the maximum lease duration value of the boundary of the cell that is less than the input lease duration, i+ corresponds to the minimum lease duration value of the boundary of the cell that is greater than input lease duration, j− corresponds to the maximum lease mileage value of the boundary of the cell that is less than the input lease mileage, j+ corresponds to the minimum lease mileage value of the boundary of the cell that is greater than the input lease mileage, dxRV(i,j) is the signed distance along the lease duration axis between the point for which the residual value factor is being evaluated and point (i,j), expressed in years, dyRV(i,j) is the signed distance along the lease mileage axis between the point for which the residual value factor is being evaluated and point (i,j), expressed in miles, d(RV(i,j),RV(k,l)) is the distance between points (i,j) and (k,l), expressed in $(years^2+miles^2)^{1/2}$ and storing by the data processing system said extrapolated residual value factor in said first table in association with said specified value.

2. The method of claim 1, wherein said extrapolated residual value factor is a median value of the residual value factors associated with said selected records.

3. The method of claim 1, wherein said step of estimating first residual value factors comprises the steps of:

for each record of said learning database;

selecting specified values of said first table bordering the value of said record corresponding to said at least one lease duration and lease mileage; and, extrapolating a first residual value factor from the residual value factors associated to said selected specified values of said first table.

4. The method of claim 3, wherein said extrapolation is a linear extrapolation.

5. The method of claim 1, wherein said step of estimating first residual value factors comprises the steps of:
for each record of said learning database, comparing the value of said record corresponding to said at least one lease duration and lease mileage with said specified values of said first table; and,
when said value of said record corresponding to said at least one lease duration and lease mileage is bordered on specified values of said first table, determining a first residual value factor of said record by performing a linear extrapolation on residual value factors associated with specified values of said first table bordering said value of said record corresponding to said at least one lease duration and lease mileage,
else, determining a first residual value factor of said record by performing a linear extrapolation on residual value factors associated with specified values of said first table bordering said value of said record corresponding to said at least one lease duration and lease mileage wherein first residual value factors of missing bordering specified values of said first table are estimated.

6. The method of claim 1, wherein said step of selecting at least one modality comprising a lease condition or product characteristic of said learning database, determining residual value factor corrections associated with the selected modality and said first residual value factors and building at least one other table storing the selected modality and said residual value factor corrections associated therewith, comprises the steps of:
determining an error criterion to evaluate lease duration and lease mileage influence on residual value factor correction;
setting an error variable to the greatest reachable error value;
selecting a first variable to be tested;
selecting a modality of said selected first variable to be tested and the learning database records that correspond to said selected modality;
determining a residual value factor correction according to a difference between first residual value factor estimations and resale value factors of said selected records corresponding to said selected modality;
repeating the preceding two steps until all modalities of said selected variable to be tested have been selected;
estimating the error associated with said selected variable;
when said estimated error is lower than said error variable:
setting said error variable to said estimated error;
storing a reference of said selected variable;
storing modalities of said selected variable and associated correction in said at least one other table; and,
repeating the above steps until all the variables to be tested have been selected.

7. The method of claim 6, wherein said determined residual value factor correction is a median value of the differences between first residual value factor estimations and resale value factors of said selected records corresponding to said selected modality.

8. The method of claim 1, further comprises a step analyzing said learning database records to detect aberrant records, and isolating the aberrant records from said learning database.

9. The method of claim 1, wherein said specified values of said at least one lease duration and lease mileage are determined so that learning database records are uniformly distributed in said first table.

10. The method of claim 1, further comprising the steps of:
inputting a value of said leased product corresponding to said at least one lease duration and lease mileage;
determining a first residual value factor estimation from said first table;
inputting the value of said leased product corresponding to said at least one other lease condition or product characteristic; and
determining at least one residual value factor correction from said at least one other table.

11. The method of claim 10, wherein said step of determining a first residual value factor from said first table, comprises the steps of:
selecting specified values of said first table bordering the value of the leased product corresponding to said at least one lease duration and lease mileage; and,
extrapolating a first residual value factor from the residual value factors associated with said selected specified values of said first table.

12. The method of claim 11, wherein said extrapolation is a linear extrapolation.

13. The method of claim 10, wherein said step of determining a first residual value factor from said first table, comprises the steps of:
comparing the value of said leased product corresponding to said at least one lease duration and lease mileage with said specified values of first table; and,
when said value of said leased product corresponding to said at least one lease duration and lease mileage borders specified values of said first table, determining a first residual value factor of said leased product by performing a linear extrapolation on residual value factors associated with specified values of said first table bordering said value of said leased product corresponding to said at least one lease duration and lease mileage;
else, determining a first residual value factor of said leased product by performing a linear extrapolation on residual value factors associated with specified values of said first table bordering said value of said leased product corresponding to said at least one lease duration and lease mileage wherein residual value factors of missing bordering specified values of said first table are estimated.

14. The method of claim 1, wherein said leased products are vehicles.

* * * * *